April 20, 1965     E. WILDHABER     3,178,966
GEAR DRIVE
Filed Feb. 26, 1962     2 Sheets-Sheet 1
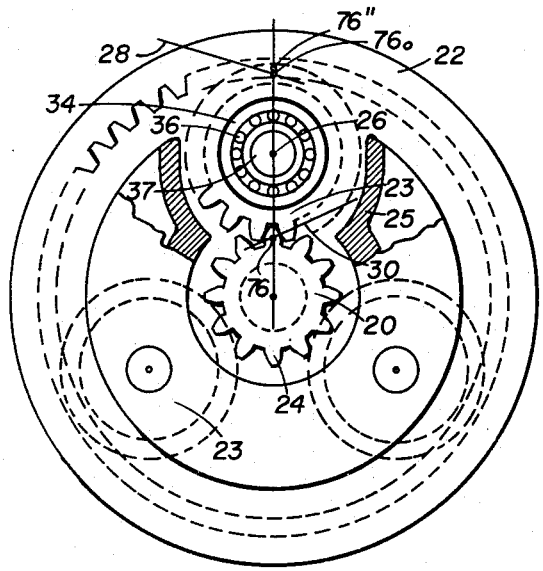
FIG. 1
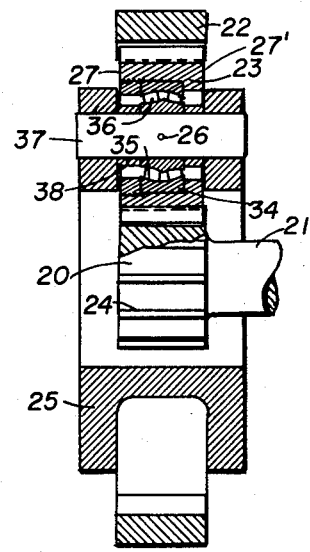
FIG. 2
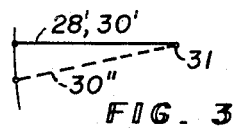
FIG. 3
FIG. 4
FIG. 8
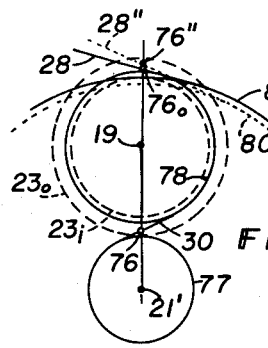
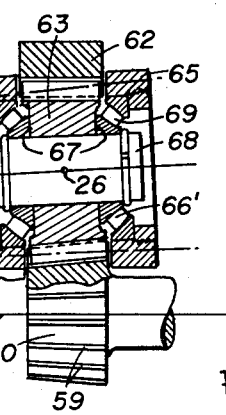
FIG. 5
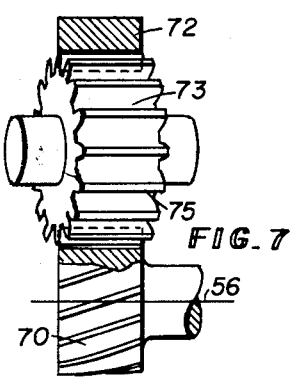
FIG. 6
FIG. 7
INVENTOR:
Ernest Wildhaber INVENTOR:
Ernest Wildhaber

United States Patent Office 3,178,966
Patented Apr. 20, 1965

3,178,966
GEAR DRIVE
Ernest Wildhaber, Brighton, N.Y.
(124 Summit Drive, Rochester, N.Y.)
Filed Feb. 26, 1962, Ser. No. 175,667
10 Claims. (Cl. 74—801)

The present invention relates to gear drives comprising an external gear, an internally toothed gear coaxial therewith, and a plurality of intermediate gears each meshing with said external and said internally toothed gear.

One object of the invention is to provide a gear drive of this kind wherein the several intermediate gears are constrained to transmit approximately equal loads. Further objects are to achieve tooth loads whose resultants are located approximately midway between the tooth ends at all loads, large or small, and to achieve tooth loads that are spread over the length of the teeth or over large portions of the tooth length. A further object is to achieve this in a simple manner. Another aim is to devise a very compact gear drive with electric motor.

These aims are accomplished with a novel self adjustment of the gears, Also I provide an electric motor with hollow spindle, with gearing adjacent one end of said spindle, and a shaft connected with said gearing reaching through said hollow spindle and being connected with said spindle at its opposite end, so as to let the shaft connection with said gearing adjust and center itself.

Other objects will be apparent in the course of the specification and in the recital of the appended claims. These objects may be attained singly or in combination.

Embodiments of the invention will be described with the drawings, in which

FIG. 1 is a somewhat diagrammatic end view of a gear drive constructed according to the present invention, shown partly in section.

FIG. 2 is an axial section corresponding to FIG. 1, and partly a side view.

FIGS. 3 and 4 are diagrams illustrative of the principle underlying the self adjustment provided by the present invention.

FIG. 5 is a fragmentary axial section generally similar to FIG. 2 but referring to a gear drive with helical gears.

FIGS. 6 and 7 are fragmentary axial sections illustrative of modifications.

FIG. 8 is a diagram showing a preferred disposition when the intermediate gears are larger than the central pinion.

Figure 9:
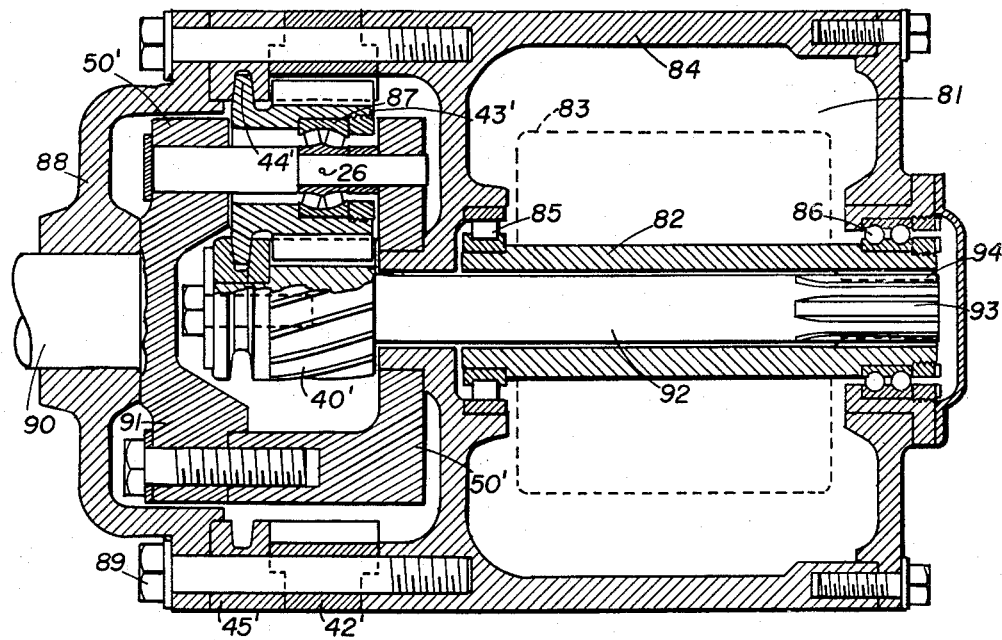

FIG. 9 is an axial section of a gear-drive unit with electric motor, constructed according to the present invention. The gearing is disposed at one end of a motor that has a hollow spindle. The drive shaft of said gearing extends through said hollow spindle and is connected therewith at the opposite end of the motor, to provide space for the self adjustment of the drive pinion.

Figure 11:
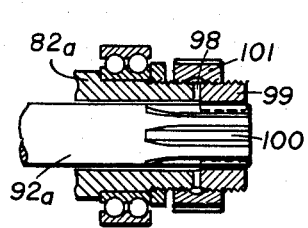
Figure 10:
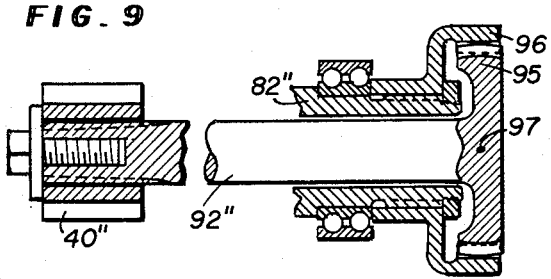

FIGS. 10 and 11 are axial sections illustrating modified connections of said drive shaft with the hollow motor spindle.

Figure 12:
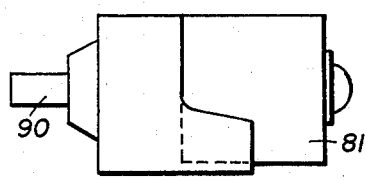

FIG. 12 is a side view at reduced scale, showing the general outline of the unit shown in FIG. 9 somewhat diagrammatically.

Figure 13:
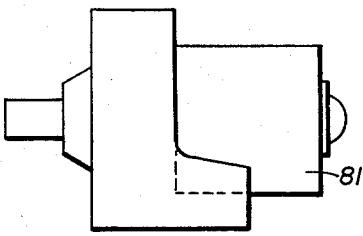

FIG. 13 is a side view showing the general outline of a similar unit that provides a larger reduction ratio.

The gearing illustrated in FIGS. 1 and 2 comprises a central pinion or gear 20 with shaft 21, an internally toothed or internal gear 22 coaxial therewith, and a plurality of intermediate gears 23, each meshing with both the central pinion 20 and with the internal gear 22. In the instance illustrated the gears are spur gears, having straight teeth such as shown on pinion 20 at 24. The intermediate gears 23 are rotatably mounted on a part or element 25.

In the vicinity of the gears 23 the pinion 20 is unsupported by bearings and is free to center itself on the several gears 23. Thereby the load is evenly split up among the gears 23. To further insure that the resultant of the tooth load on each gear passes through the center of its teeth, rather than near one end thereof at times, and that the middle of the teeth is approximately the center of the contact region, a further adjustment is provided. Each intermediate gear 23 is free to pivotally adjust itself about a center 26 (FIG. 2) that lies on its axis inside of and midway within the reach of its teeth. Center 26 lies midway between the ends 27, 27' of gear 23.

The self-adjustment operates as follows:

The exact direction of the teeth of pinion 20 depends on the distance of pinion 20 from the holding point of its shaft 21, on the way its shaft is held at that distance, on the deflection of the shaft under load, on the deflection of the gear teeth and on manufacturing tolerances. Each intermediate gear 23 adjusts itself to the tooth sides of the internal gear that contact under load. The contacting tooth sides of the internal gear 22 however do not maintain a gear 23 in a single definite position. The gear 23 is still capable to pivot a small amount about an axis that coincides with the mean contact normal 28 (FIG. 1), or about an axis parallel thereto and passing through center 26. That is, it still can be slightly turned about an axis that extends in the direction of the tooth pressure.

FIGS. 3 and 4 show what happens to the opposite mean contact normal 30 when gear 23 is so turned. Inasmuch as we have to consider angular displacements only, without consideration of small linear displacements perpendicular to the tooth pressure, we can proceed as if lines 28, 30 would intersect. FIGS. 3 and 4 show straight lines 28', 30' that intersect at 31 and are parallel to the exact mathematical directions of the contact normals 28, 30 respectively. FIG. 4 is a view taken in the same direction as FIG. 1, while FIG. 3 is a plan view looking down on FIG. 4 from the top.

When line 30' is turned about axis 28' it describes a portion of a conical surface 32. Dotted line 30'' shows a position arrived at during such turning motion. The actual turning displacements are very much smaller than shown, so small that it makes no measurable difference when line 30' is turned about an axis 33 (FIG. 4) instead, or about another axis that lies in the drawing plane of FIG. 4 and passes through 31. The turning displacement changes the direction of the contact normal 30 and the lengthwise direction of the teeth of intermediate gear 23, to adapt its tooth direction to the tooth direction of the central pinion 20. Accordingly with this disposition the intermediate gears 23 have the desired central tooth contact in their mesh with pinion 20 as well as in their mesh with internal gear 22.

In the embodiments illustrated the pivotal adjustment of each intermediate gear is attained through use of a bearing or bearings that permit at least a small amount of adjustment about center 26. Thus bearing 34 has a concave spherical raceway 35 centered at 26. Its outer race is secured to the inside of gear 23. Its rollers 36 are of barrel form, adapted to contact raceway 35. The inner race of bearing 34 rests on a pin 37 rigidly secured to part 25. Its raceway matches the shape of the rollers 36. Spacers 38 maintain said inner race axially in position.

The gearing shown can be used in two ways, either as a planetary unit or as a unit whose intermediate gears (23) have fixed axes. In a planetary unit the internal gear 22 and the parts or element rigid therewith are maintained stationary, that is rigid with the housing of the unit. The intermediate gears 23 are then planets, and part or element 25 is the planet carrier and the driven member, or one of the driving and driven members.

In a unit with fixed axes element 25 is maintained stationary and connected with the housing. And internal gear 22 is secured to the driven member, or to the driving member.

The embodiment illustrated with FIG. 5 contains helical gears rather than spur gears with straight teeth. As known, the load carried by helical teeth contains an axial thrust component. The thrust components of the two meshes of each intermediate helical gear 43 are equal and opposite and constitute a turning or tilting moment which ordinarily would disturb the self adjustment about pivot 26. Such disturbance is avoided by taking up the thrust in line with the teeth. Gear 43 contains a circular flange 44 with slightly tapered sides. These sides engage matching sides of a groove provided in a ring 45 that is rigidly secured to internal gear 42. They also engage the sides of a groove provided on a pair of rings 46, 46' that are coaxial with the central pinion 40 and rigidly secured thereto. The engagement of flange 44 with said grooves takes up the axial thrust components and balances said tilting moment. Because of its taper the flange 44 also permits the very slight pivotal displacement required. As can be mathematically demonstrated further, the self adjustment is thus effective also for helical teeth, in combination with thrust flange 44.

Each intermediate gear 43 is rotatably mounted by means of a double angular ball bearing 47. The spaced outer races thereof are secured to the inside of gear 43. The inner race rests on a pin 48 rigidly secured to part or element 50. It is axially positioned with a spacer 51. The double ball bearing 47 is so placed that the opposite contact normals 52, 52' of the balls 53 intersect at center 26. In this way a slight but sufficient amount of pivotal adjustment about center 26 is feasible. Broadly, if the opposite mean contact normals (52, 52') of a double antifriction bearing intersect on the axis of the intermediate gear, the slight amount of pivotal adjustment afforded thereby is generally sufficient for our purpose. It should also be understood that plain bearings may be used in place of the antifriction bearings shown, and that the pivotal adjustment could also be separately attained rather than directly with the bearings.

Helical teeth provide a gradual mesh engagement favorable for noiseless operation. The embodiment illustrated in FIG. 6 provides gradual mesh engagement in a different way. Here the axis 55 of each intermediate gear 63 is inclined to the direction of the common axis 56 of the central pinion 60 and of the internal gear 62. When extended, axis 55 intersects axis 56. The axis of instantaneous relative motion, or instant axis, passes through the intersection point of the axes 55, 56. 57 and 58 denote the instant axes for the mesh of the intermediate gear 63 with central pinion 60 and with internal gear 62 respectively. The instant axes are seen to be inclined to the lengthwise direction of the intermeshing tooth zones. This indicates that the mesh starts at one end of the teeth. It starts gradually. Internal gear 62 may be provided with involute teeth extending parallel to its axis, as commonly used. The intermediate gears 63 are then generated conjugate to the internal gear 62, and pinion 60 is generated conjugate to the intermediate gears. Pinion 60 is also conjugate to an external gear that is the matching counterpart of internal gear 62. The gears 60, 63 are slightly tapered and have straight teeth, designated at 59 on gear 60.

Each intermediate gear 63 is rotatably mounted on a part or element 65 free to pivot about a center 26. Center 26 lies on its axis 55 inside of the reach of its teeth and midway between the end faces of gear 63. A pair of tapered antifriction bearings 66, 66' are used to rotatably mount each gear 63. Their outer races are held by element 65, and their inner races move together with gear 63. They abut the opposite sides 67 of gear 63 and are seated on a pin 68 rigidly secured to gear 63. The raceways of the outer races lie on a common spherical surface centered at 26. They are engaged by barrel-shaped and slightly tapered rollers 69. A cage for holding the rollers is also used, but is omitted in these small-scale figures.

FIG. 7 illustrates a further way of attaining gradual mesh engagement without requiring the thrust disks described with FIG. 5. Each intermediate gear 73 is set at an angle, so that its axis is inclined to the drawing plane which contains the common axis 56 of the central pinion 70 and of internal gear 72. Intermediate gear 73 is rotatably mounted in the manner described with FIG. 6. It contains straight teeth 75 that are parallel to its axis. The internal gear 72 and the central pinion 70 are formed conjugate to gear 73.

FIG. 8 illustrates a design refinement for gears with parallel axes, where the intermediate gear is larger than the central pinion. In such cases the addendum of the pinion (pinion 20 in FIG. 1) is preferably made longer than the addendum of the intermediate gear (23), to keep clear of undercut. Conventionally the intermediate gear runs with the same pitch circle with both the central pinion (20) and the internal gear (22). The mesh then passes through pitch points 76, 76'' (FIG. 1) of equal distance from the turning axis. Gear 23 then has a shortened addendum also in the mesh with internal gear 22, where it is undesirable. What is desired in this mesh is a longer addendum and a smaller pressure angle. This I attain by increasing the tooth number of the internal gear as compared with conventional practice. Of course the tooth numbers must also fulfill the known requirement to permit assembly of all intermediate gears.

Diagram FIG. 8 shows the base circle 77 of the involute pinion 20 with axis 21', and the base circle 78 of involute gear 23 with axis 19. The dotted circles $23_0$, $23_1$ represent the outside circle and the inside circle or root circle of gear 23. The path of contact between gears 20, 23 coincides with the contact normal 30 and is tangent to both base circles 77, 78. Dotted circle 80'' represents the base circle of a conventional internal involute gear. Its path of contact 28'' is tangent to the base circles 78, 80'' and results in a pitch point 76''.

The invention uses a base circle 80 of the internal gear. It is larger than base circle 80'' because of the increased tooth number, and results in a path of contact and contact normal 28 with pitch point $76_0$. Normal 28 is tangent to the base circles 78, 80. It has the desired smaller pressure angle and provides a larger addendum on gear 23 than path 28''.

For given tooth numbers $n$ of the central pinion and $N$ of the internal gear the tooth number of each intermediate gear is then smaller than $\frac{1}{2}(N-n)$, that is smaller than half the difference of the tooth numbers of the internal gear and of the central external gear or pinion. In conventional practice it equals $\frac{1}{2}(N-n)$.

Gear drive unit with electric motor

A very compact gear drive unit is obtained by combining the described gearing with an electric motor in a novel way. The motor frame is rigid with the housing of the gearing. To gain space for the self adjustment of the central gear or pinion, the motor 81 contains a hollow spindle or shaft 82 which carries the rotor diagrammatically indicated by its outline 83. The motor itself otherwise does not form part of the present invention. It is of known construction, with armature, lubrication and ventilation. Only the parts related to the present invention are illustrated, the spindle 82, the frame or housing 84 and the bearings 85, 86 that rotatably mount spindle 82.

The gearing itself is in all essentials like the helical gearing described with FIG. 5. It comprises a central pinion or external gear 40', an internal gear 42' and a plurality of intermediate gears 43' that mesh each with both pinion 40' and internal gear 42'. Each intermediate gear contains a thrust flange 44' with slightly tapered side surfaces engaging grooves formed in ring-shaped portions rigid with gear 42' and pinion 40' respectively, as described with FIG. 5. Each intermediate gear 43' is rotatably mounted on a common part or element 50' by means of a spherical bearing 87 that has a spherical raceway centered at 26. It leaves gear 43' free to pivotally adjust itself about center 26.

Internal gear 42', ring 45' and end part 88 are rigidly secured to frame or housing 84 by means of threaded bolts 89. The known provisions are made to prevent oil leakage. The intermediate gears 43' are planets, and element 50' is the driven member. Element 50' is made up of two parts rigidly secured to each other by screws. Part 91 thereof is formed integral with the driven shaft 90.

External gear or pinion 40' is rigid with a shaft 92 that extends through hollow spindle 82. Pinion 40' is located at one end of shaft 92. The opposite end of shaft 92 is connected to spindle 82. Thus the gearing and the shaft connection are on opposite sides of the motor. Shaft 92 has a splined end 93 that engages internal splines 94 provided on spindle 82. Because of the large distance of pinion 40' from its support 93, 94, pinion 40' is enabled to center itself on the plurality of planets 43'. Much space is gained with the use of a hollow motor spindle, and a very compact unit is attained. A general outline of the unit is diagrammatically shown in FIG. 12. FIG. 13 shows a similar unit that has an increased reduction ratio, attainable by using a larger tooth ratio between the gears 43' and 40'.

FIG. 10 illustrates a modified connection between the shaft 92" of the drive pinion 40" and the hollow motor spindle 82". Shaft 92" extends through hollow spindle 82" and is formed integral with a crowned gear 95 that engages an internal gear 96 rigidly secured to spindle 82". Internal gear 96 contains straight teeth and together with gear 95 forms a gear coupling, also called a flexible coupling. It permits moderate relative pivotal motion about a center 97. At the end opposite to crowned gear 95 shaft 92" is rigidly connected with drive pinion 40" by taper splines.

In the modified connection illustrated in FIG. 11 the hollow motor spindle 82$_a$ is connected by a toothed face coupling 98 to a sleeve 99, which in turn is secured to the drive shaft 92$_a$ by splines 100. Sleeve 99 may be fixed axially on shaft 92$_a$, for instance by a pin (not shown). The face coupling 98 is maintained in rigid engagement by a double-threaded nut 101 that engages threads of opposite hand provided at the end of spindle 82$_a$ and on the outside of sleeve 99 respectively.

While I have shown helical gears in FIG. 9, other gears may also be used instead, such as those described with FIGS. 2, 6 and 7. In such cases the thrust flanges 44' and the ring portions engaged thereby are omitted. Also herringbone gears and other gears may be used. Gearing with fixed axes may also be used in place of the planetary gearing described, retaining the hollow motor spindle and its connection with the drive shaft at the end of the motor opposite to the gearing.

Also I may use only part of the whole invention, if desired, and secure the advantage of the hollow motor spindle and its described connection with a drive shaft without the pivotal mounting of the intermediate gears. Thus I may use helical gears in the described gearing while mounting the intermediate gears in conventional manner, omitting the thrust flanges 44' and the portions engaged thereby. In this case I rely on tooth crowning to retain a sufficient tooth-bearing area within the boundaries of the gear teeth at all loads.

While the invention has been described with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

I claim:

1. Gear drive comprising an external gear and an internal gear larger than said external gear and coaxial therewith, a plurality of intermediate gears each meshing with both said coaxial gears, a part on which said intermediate gears are rotatably mounted, a rotatable shaft, means for supporting said shaft adjacent one of its ends only, said external gear being rigid with and located at the opposite end of said shaft, said shaft centering said external gear on said intermediate gears, and means for rotatably mounting each of said intermediate gears on said part free to pivot about a center lying on its axis inside of the reach of its teeth.

2. Gear drive according to claim 1, wherein the axes of said intermediate gears are parallel to the axis of said coaxial gears, and comprising means embodying spherical bearing means, at least approximately, on which each intermediate gear is rotatably mounted.

3. Gear drive according to claim 1, wherein the axes of said intermediate gears are angularly disposed to the direction of the axis of said coaxial gears, and wherein at least one of all said gears contains straight teeth that extend parallel to its axis.

4. Gear drive according to claim 1, wherein the teeth of said intermediate gears are straight and parallel to the axis of the respective gears.

5. Gear drive according to claim 1, wherein said intermediate gears are helical gears, each containing at least one ring-shaped tapered guide surface coaxial and rigid therewith and disposed adjacent one end of its teeth, a guide surface rigid with a mating gear and with which said tapered guide surface engages for taking up the axial thrust of said helical teeth.

6. Gear drive according to claim 1, wherein the tooth number of each intermediate gear is smaller than half the difference of the tooth numbers of said internal gear and said external gear.

7. Gear drive comprising a housing, a hollow spindle journaled in said housing, a shaft extending through said hollow spindle, an external gear rigid with said shaft and disposed at one end thereof, said shaft being connected to said spindle at its opposite end to rotate therewith, said shaft being without support between said gear and said opposite end, a first element, an internal gear fixed to said first element coaxially with said external gear, a second element, a plurality of intermediate gears carried on said second element, each of said intermediate gears meshing with said external gear and with said internal gear, and means embodying spherical bearing means, at least approximately, for rotatably mounting each intermediate gear free to pivotally adjust itself about a center lying on its axis, and means for maintaining one of said elements stationary with respect to said housing and for rotatably mounting the other element to turn with respect to said housing.

8. In a gear drive for use with an electric motor having a hollow spindle, a shaft extending through said hollow spindle, an external gear rigid with said shaft and disposed at one end thereof, said shaft being connected to said spindle at its opposite end, a first element, an internal gear rigid with said first element and coaxial with said external gear, a second element, a plurality of intermediate gears carried on said second element and rotatably mounted thereon, each of said intermediate gears meshing with said external gear and said internal gear, said shaft being without support between said external gear and said opposite end, said shaft centering said external gear on said intermediate gears, and means for maintaining one of said elements rigid and for rotatably mounting the other element to turn with respect to said rigid element.

9. In a gear drive for use with an electric motor having a hollow spindle, a shaft extending through said hollow spindle, an external gear rigid with said shaft and disposed at one end thereof, the opposite end of said shaft being connected to said spindle, an internal gear rigidly mounted coaxially with said spindle, a rotatable element coaxial with said spindle, a plurality of planetary gears carried by said element and rotatably mounted thereon, each of said planetary gears meshing with said external gear and said internal gear, to drive said element, said shaft being without support between said external gear and said opposite end, and centering said external gear on said planetary gears.

10. Gear drive comprising a housing, an external gear, a first element, an internal gear secured to said first element and coaxial with said external gear, a second element, a plurality of intermediate gears carried on said second element, each of said intermediate gears meshing with said external gear and with said internal gear and having an axis substantially parallel to the axis of said external gear, the tooth number of each intermediate gear being smaller than half the difference of the tooth numbers of said internal gear and said external gear, so that each intermediate gear rolls with a smaller pitch circle on said internal gear than the pitch circle with which it rolls on said external gear, and means for maintaining one of said two elements stationary with respect to said housing and for rotatably mounting the other element in said housing.

References Cited by the Examiner

UNITED STATES PATENTS

| | | | |
|---|---|---|---|
| 1,586,309 | 5/26 | Hult | 74—801 |
| 2,144,937 | 1/39 | Ryder | 74—801 |
| 2,263,625 | 11/41 | Gregg | 74—801 X |
| 2,547,877 | 4/51 | Lucia | 74—801 |
| 3,090,258 | 5/63 | Zink et al. | 74—801 |

DON A. WAITE, *Primary Examiner.*